UNITED STATES PATENT OFFICE.

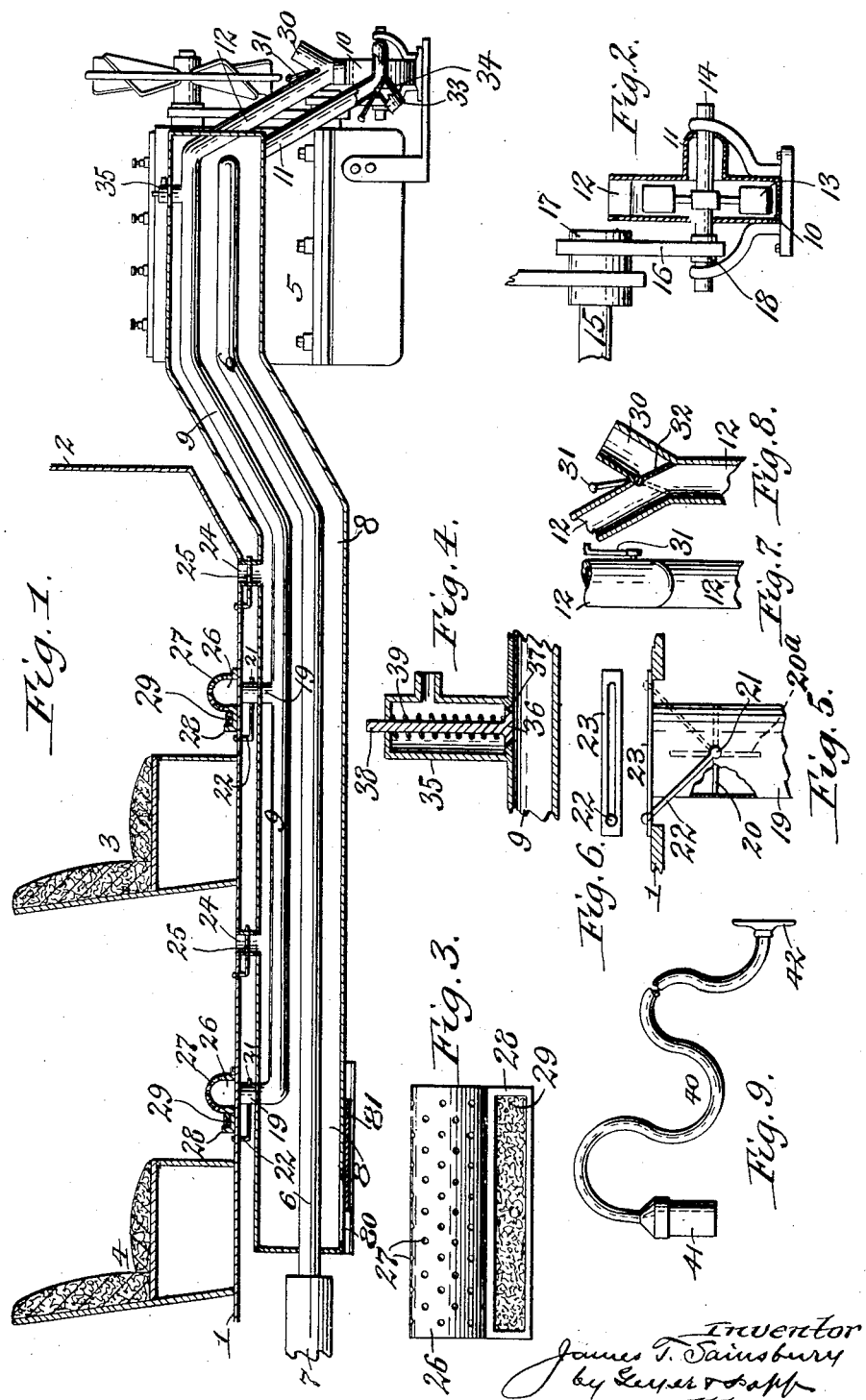

JAMES T. SAINSBURY, OF BUFFALO, NEW YORK, ASSIGNOR OF FIVE-TWELFTHS TO GEORGE F. YATES, OF BUFFALO, NEW YORK.

HEATING APPARATUS FOR AUTOMOBILES.

1,331,384.   Specification of Letters Patent.   Patented Feb. 17, 1920.

Application filed August 16, 1918. Serial No. 250,263.

*To all whom it may concern:*

Be it known that I, JAMES T. SAINSBURY, a citizen of the United States, residing at Buffalo, in the county of Erie and State of New York, have invented new and useful Improvements in Heating Apparatus for Automobiles, of which the following is a specification.

This invention relates to means for utilizing the heat of an explosion engine which drives an automobile for heating the passenger compartment of an automobile during cold weather, which means are so organized that the proper amount of moisture may be added to the heated air so as to promote the health of the passengers.

In the accompanying drawings:

Figure 1 is a fragmentary longitudinal section of an automobile equipped with my improvements. Fig. 2 is a fragmentary vertical section of one form of air propelling device and associated parts forming part of my invention. Fig. 3 is a top plan view, on an enlarged scale, of a humidifier for use in connection with my invention. Fig. 4 is a fragmentary vertical section showing one form of safety valve suitable for use in connection with this invention. Fig. 5 is a side elevation, partly in section, of a valve suitable for use in connection with the air conduits leading to the passenger compartment of the automobile. Fig. 6 is a top plan view of the same. Fig. 7 is a fragmentary side elevation of a two-way valve suitable for use in connecting the air conduits of this apparatus. Fig. 8 is a vertical section of the same. Fig. 9 is an elevation of an air cleaner for use in connection with this apparatus.

Similar characters of reference indicate corresponding parts throughout the several views.

In the drawings, only those parts of an automobile are shown which are necessary to illustrate the application of my invention and as there shown the same comprises a body having a floor 1, a dash board 2 rising from the front end of this floor and two seats 3, 4; arranged one behind the other on the floor and forming two passenger compartments immediately in front of these seats, an explosion engine 5 which is operatively connected with the usual driving wheels of an automobile for propelling the same and an exhaust pipe 6 leading from the explosion engine rearwardly underneath the automobile body and to a muffler 7 through which latter the burnt or spent hot gases from the engine are conducted to the atmosphere.

My improvements which are associated with these parts of an automobile are preferably constructed as follows:

8 represents the main or receiving section of an air conduit which incloses the exhaust pipe of the engine and which is provided at its rear end with an inlet 80 through which the external air may enter this receiving pipe and move forwardly therethrough or in a direction opposite to the flow of the burnt gases through the exhaust pipe, so that this air is heated in its course from the rear inlet end of this receiving pipe to the front or outlet end thereof. This inlet may be either opened or closed or regulated as to capacity by a valve 81 for instance of the slide type, as shown in Fig. 1. Within this receiving section of the air conduit is arranged lengthwise adjacent to the exhaust pipe, a delivery or auxiliary pipe section 9 of the air conduit through which latter the air moves rearwardly or in the same direction as the flow of the burnt gases through the exhaust pipe and is heated thereby. The rear part of this delivery conduit section is provided with one or more air outlet pipes 19 for reaching the passenger compartments, each of these outlets preferably opening through the bottom or floor of the automobile, immediately in front of one of the seats.

The air is drawn forwardly through the outer or main section of the air conduit and discharged rearwardly through the delivery or auxiliary section of the air conduit by an air propelling device which is preferably operated by power derived from the engine which drives the automobile. In the form of air propelling device shown in the drawings, as an example, the same comprises a fan casing 10 having its eye or inlet at the axis thereof connected by an inlet branch pipe 11 with the outlet at the front end of the main air section while the outlet of this casing at the periphery thereof is connected by means of an outlet branch pipe 12 with the front or receiving end of the auxiliary air pipe section. Within the fan casing is arranged a set of rotating fan blades 13 which cause the air to be drawn in through the eye of the fan case and discharged through the outlet thereof, these fan blades being mounted on a horizontal shaft 14 extending through the casing and driven from the main shaft 15 of the engine by means of a belt 16 passing around a driving pulley 17 on the engine shaft and a driven pulley 18 on the fan shaft. When the engine is in operation, the fan is actuated so as to propel the external air from the rear end of the main conduit section forwardly in contact with the exhaust pipe so as to receive a preliminary heating therefrom and the same is then discharged rearwardly through the delivery conduit section where this fresh air supply is further heated by reason of the proximity of the exhaust pipe and is then discharged through the outlets 19 on the rear parts of the delivery pipe into the passenger compartments where this heated air raises the temperature sufficiently to increase the comfort of the passengers and render automobile driving or riding more agreeable in cold weather. The heat in the exhaust gas is thus utilized to advantage instead of being wholly wasted as has been the case hertofore and permits of heating the passenger compartment without any added cost for fuel.

Each of the air outlets 19 of the delivery pipe is provided with a valve whereby the supply of warm air to the passenger compartment may be controlled or regulated. Any suitable valve may be employed for this purpose, that shown in the drawings, for example, being suitable and comprising a butterfly valve 20 which is pivoted centrally in the outlet pipe by means of a spindle 21 passing through the adjacent part of this pipe, and a handle 22 projecting from one end of this spindle outside of the air pipe upwardly through a slotted guide 23 in the floor of the passenger compartment. Upon shifting this handle into one extreme position the air valve 20 extends across the adjacent part of this air pipe, as shown by full lines in Fig. 5 and cuts off the discharge of air into the passenger compartment, while upon swinging this handle into the opposite extreme of its movement, this air valve will be shifted into a position parallel with the length of this air pipe, as shown by dotted lines 20$^a$ in Fig. 5, thereby opening this air outlet fully and permitting the maximum quantity of warm air to enter the compartment. By this means the warm air supply to the passenger compartment can be either shut off or opened fully, or can be regulated by shifting this valve into a more or less closed position.

In order to permit of ventilating the passenger compartments by withdrawing the air from the space immediately in front of the seats, each of these spaces is connected by means of a ventilating branch or inlet pipe 24 with the main or air receiving pipe of the air conduit, each of these ventilating branch pipes being preferably extended through the floor of the automobile and provided with a valve 25 similar to that as shown in Fig. 5, so as to permit the ventilating effect to be regulated or stopped altogether.

For the purpose of conditioning the air which is supplied to the passenger compartment, a humidifier is provided which preferably comprises an air distributing chamber 26 arranged on the floor of the car over each one of the outlet branches 19 so that the latter open into the distributing chamber. The top of each of these distributing chambers is preferably perforated as shown at 27 in Figs. 1 and 3, so that the warm air is distributed over a greater area in the passenger compartment. Adjacent to this distributing chamber is arranged a pan 28 which is adapted to be filled with water, and in this pan is arranged an absorbent pad 29 of fibrous material. As the warm air enters the distributing chamber, the same raises the temperature of the water in this pan and together with the operation of said pad vaporizes the same, so that when this air passes through the perforations in the top of the distributing chamber, the same mixes with the vapors rising from the absorbent pad and thus humidifies the air and causes the same to be supplied to the passengers in a condition to promote health and comfort.

When it is not desired to use this heating and ventilating system, the same may be rendered inoperative by throwing off the belt 16 from one or the other of the pulleys 17 or 18, whereby the operation of the air-propelling device ceases and neither warm air will be supplied to the passenger compartment nor will air be withdrawn from these places for ventilating purposes.

If it is desired to maintain the operative connection between the air propeller and the explosion engine while the hot air supply valves 20 are closed, the air which otherwise would be delivered in a warm condition to the passenger compartment may be discharged into the outer atmosphere instead of being conducted to the delivery section 9 of the air pipe. This is best accomplished by providing the outlet branch 12 with an outward vent pipe 30 which is preferably connected with the branch pipe 12 immediately adjacent to the outlet of the fan casing and opens to the outer atmosphere. At the junction of the outlet branch pipe and the outward vent pipe 30 is arranged a two-way valve which permits the air discharged by the fan or propeller to be delivered either to the passenger compartment or to the outer atmosphere. This two-way valve may be variously constructed, but as shown in Figs. 7 and 8, the same may comprise a transversely-swinging gate 32 which is pivoted on the walls of these air conduits and provided externally with a handle 31. Upon swinging this gate into the position shown by full lines in Fig. 8, the air will be directed from the propeller to the delivery pipe 9 which leads to the passenger compartment, while upon swinging this valve into the position shown by dotted lines in this figure, the air will be directed from the fan to the atmosphere. In like manner air may be drawn from the external atmosphere into the inlet of the fan casing without drawing the same through the main or receiving section 8 of the air conduit, this being accomplished for instance by providing the inlet branch pipe 11 with an inward vent pipe 33 arranged adjacent to the fan casing and placing a two-way valve 34 at the junction between this inlet branch pipe and the inward vent pipe which may be constructed similar to the two-way valve shown in Figs. 7 and 8, so that upon swinging the gate 34 of this valve in one direction, as shown by full lines in Fig. 1, the air propeller will draw air forwardly and lengthwise through the main air conduit section 8 while upon swinging the same in the opposite direction the air will be drawn through the inward vent pipe to the fan casing.

In order to prevent setting up a back pressure in the air propeller in the event of the outlet valves 20 being closed, and the valve 32 in the outward vent pipe also closed, a safety valve is provided which will open under excessive or abnormal air pressure and thus form a relief. Although this safety valve may be variously constructed that shown in Fig. 4 is suitable and comprises an outlet valve casing 35 which has its inner end communicating with the delivery pipe section while its outer end opens into the atmosphere, an outwardly-opening valve stopper 36 which engages with an outwardly-facing valve seat 37 around the inlet of the valve casing 35, a valve stem 38 projecting from the valve stopper upwardly through the upper end of the valve casing, and a spring 39 surrounding the valve stem and bearing at its opposite ends against the valve stopper and the top of the valve casing. This spring has its strength so determined that it will hold this valve stopper in its closed position when the air pressure within the delivery pipe section 9 is normal, but when this air pressure exceeds a predetermined normal, this spring will yield and permit the valve stopper to open so that the air is free to escape from the delivery pipe section through the valve casing 35 and to the atmosphere, thereby avoiding deranging or unduly wearing the parts of the apparatus.

If desired, the suction and blowing effect of this apparatus may be utilized for cleaning purposes by means of a flexible tube 40 which is provided at one end with a coupling sleeve 41 which may be connected either with the outward vent pipe 30 or with the inward vent pipe 33, and the opposite end of this tube being provided with a nozzle 42 for blowing or sucking dust.

It will be apparent from the foregoing that this apparatus is of substantial utility in connection with an automobile for either heating, ventilating or cleaning the same without involving very great expense and without encroaching upon the space of an automobile which is now utilized for other purposes.

I claim as my invention:

1. A heating device for automobiles comprising an explosion engine having an exhaust pipe, an air conduit having a main section which surrounds said exhaust pipe and has an inlet communicating with the atmosphere and an auxiliary section arranged within said main section and having an outlet opening toward the passenger space of the automobile, and air propelling means having an inlet communicating with said main conduit section and an outlet communicating with said auxiliary conduit section.

2. A heating device for automobiles comprising an explosion engine having an exhaust pipe, an air conduit having a main section which surrounds said exhaust pipe and has an inlet communicating with the atmosphere and an auxiliary section arranged within said main section having an outlet opening toward the passenger space of the automobile, and air propelling means having an inlet communicating with said main conduit section and an outlet communicating with said auxiliary conduit section, said main conduit being arranged to conduct the air in one direction relatively to said exhaust pipe and the auxiliary conduit section being arranged to conduct the air in an opposite direction relatively to said exhaust pipe.

3. A heating device for automobiles comprising an explosion engine having an exhaust pipe, an air conduit having a main section which surrounds said exhaust pipe and has an inlet communicating with the atmosphere and an auxiliary section arranged within said main section and having an outlet opening toward the passenger space of the automobile, and air propelling means having an inlet communicating with said main conduit section and an outlet communicating with said auxiliary conduit section, said main conduit section being arranged to conduct the air in a direction opposite to the flow of burnt gas through the exhaust pipe and said auxiliary conduit section being arranged to conduct the air in the same direction as the flow of burnt gas through the exhaust pipe.

4. A heating device for automobiles comprising a passenger compartment, an explosion engine having an exhaust pipe, an air conduit having a section inclosing said exhaust pipe and provided with a main air inlet communicating with the atmosphere outside of said compartment and a supplemental air inlet communicating with said compartment, valves arranged in said main and supplemental air inlets, and an air propelling device having an inlet communicating with said air conduit.

5. A heating device for automobiles comprising a passenger compartment, an explosion engine having a heating exhaust pipe, an air conduit having a receiving section and a delivery section arranged adjacent to the exhaust pipe and receiving heat from the latter, said receiving section communicating with the atmosphere and said delivery section opening toward said passenger compartment, an air propeller having an outlet connected with said delivery section, and a two-way valve adapted to connect the inlet of said propeller with said receiving section or with the atmosphere.

6. A heating device for automobiles comprising a passenger compartment, an explosion engine having a heating exhaust pipe, an air conduit having a receiving section and a delivery section arranged adjacent to the exhaust pipe and receiving heat from the latter, said receiving section communicating with the atmosphere and said delivery section opening toward said passenger compartment, an air propeller, a two-way valve for connecting the inlet of said propeller either with said receiving section or with the atmosphere, and a two-way valve for connecting the outlet of said propeller either with said delivery section or with the atmosphere.

JAMES T. SAINSBURY.